INVENTOR
Robert W. Beachley
BY Polachek & Saulsbury
ATTORNEYS

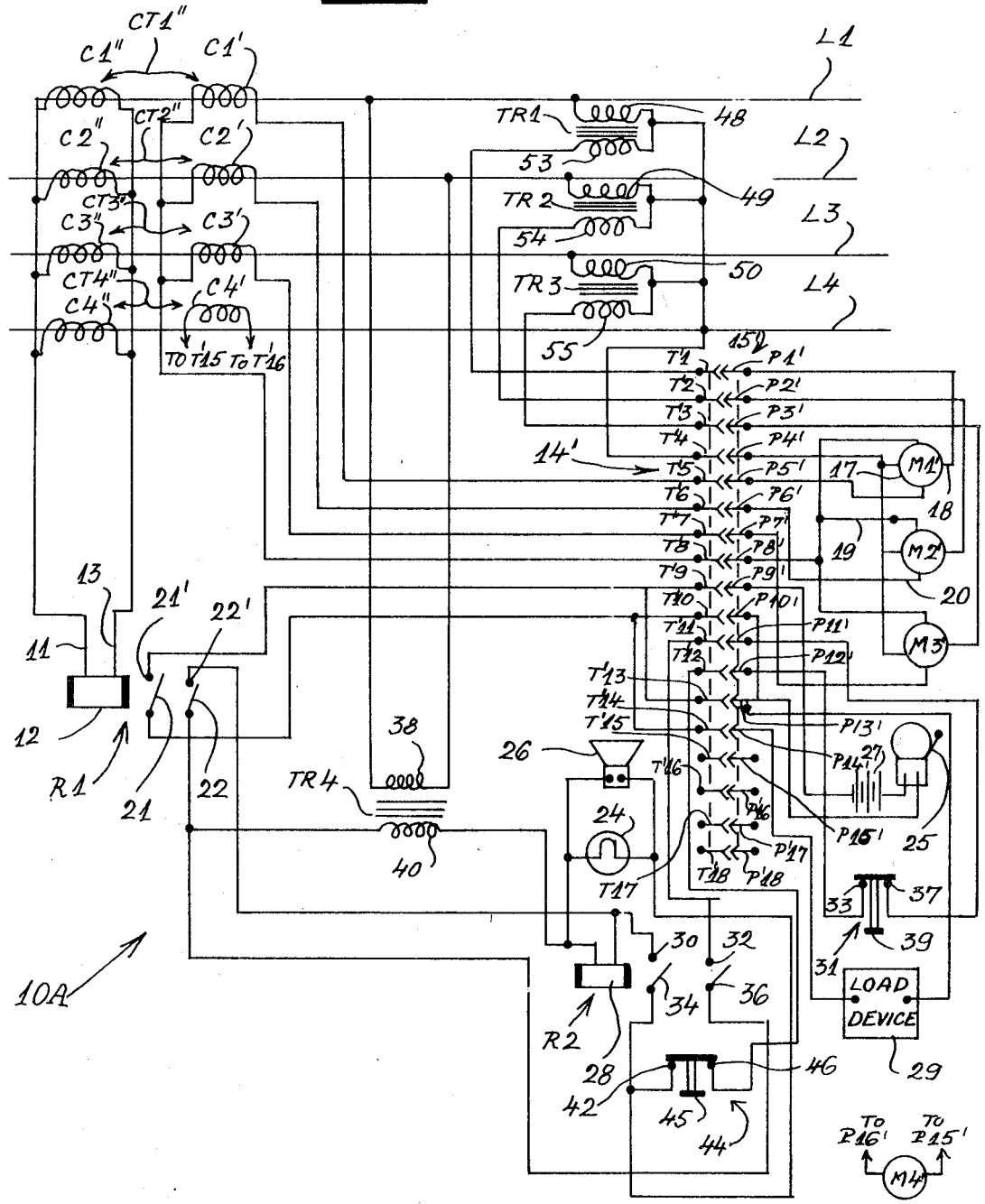

United States Patent Office 3,514,694
Patented May 26, 1970

3,514,694
MEANS FOR GROUND FAULT DETECTION, METERING AND CONTROL OF ALTERNATING CURRENT ELECTRICAL SYSTEMS
Robert W. Beachley, 5163 Murryhill Road, Charlotte, N.C. 28210
Filed Jan. 9, 1968, Ser. No. 696,535
Int. Cl. G01r 31/02
U.S. Cl. 324—51                               4 Claims

ABSTRACT OF THE DISCLOSURE

A control system is disclosed for monitoring alternating current electrical circuits to detect ground fault currents of relatively small magnitude and to permit metering of the circuit as may be desired. The control system involves the vector summation of currents in all current carrying conductors of the circuit and detection of any unbalance resulting from ground fault of any of the current carrying conductors. The deviation from zero of the vector sum is locally monitored by a current sensitive relay which, when the vector sum exceeds a preset amount, closes contacts, sounds a horn, lights a light and provides for contacts for extending the trouble signal to any desired location. A second feature of the control scheme is the inclusion of a terminal board or plug and receptacle to which control circuit wiring is brought for metering of the circuit in normal operation. The same current transformers and circuit wiring may be used for metering and ground fault current detection. An enclosure is described for current carrying cables or busbars. In the enclosure are current transformers, potential transformers, the sensitive relay and the necessary control wiring.

---

The invention concerns a control scheme for monitoring single of multiphase circuits both for normal operation and for the detection of ground fault currents should one of the conductors develop a fault. For normal operations, indicating or recording meters may be employed which indicate current in amperes for each conductor, the voltages of the circuit, power in watts for volt-amperes of the circuit, etc. Fourteen terminals may be provided on a terminal block or receptacle for exterior connection of desired metering. For ground fault current detection, the vector sum of the metering currents is constantly monitored by a current sensitive relay which has an adjustable operating range and thus closes contacts when a ground fault current of preset value occurs.

Heretofore, ground fault detecting schemes have been of several types. For many years, alternating current systems have been used which had no neutral line and thus were called ungrounded. Such systems depended on a system of lights of which one would go out when a ground fault occurred on any one phase. The system could continue to operate until a second phase ground faulted and deactivated the system by operating the circuits main protective device. Recently, systems using a Y-type distribution have come into use and the circuits have become larger with carrying capacities of 1000 amperes or more. On this type of circuit it is possible for a conductor to ground and develop an arcing fault that could create a fire without opening the circuit's main protective device. Two prior types of ground fault current detecting devices are known for this type of circuit. One has a current transformer around the connection from ground to the neutral conductor. This current transformer monitors the actual ground fault current and through appropriate circuitry gives warning and or causes system disconnection. This device is limited in that it must be applied at the system source and cannot monitor individual branch circuits. It does not provide for metering of the individual circuit conductors. The second type of known ground fault current detecting device operates by passing all conductors of an individual circuit through one current transformer. When operating without a ground fault the transformer sees a balanced magnetic field with no current flowing in the secondary of the current transformer. However, when a ground fault current is flowing, the magnetic field is no longer balanced and the resulting secondary current gives an alarm, and if necessary performs a desired control function. Since only one current transformer is used for the multiphase system, no metering of individual conductors or of the total circuit is possible.

The present invention is directed at overcoming this condition of limitation in prior circuits. The control means need not be located at the source of the system; rather for the best of control, it is desirable to install one control means on each branch of a multibranch distribution system. It will thus be possible to quickly isolate a ground fault when detected as well as to meter each branch for most efficient use of the distribution system. Because the present invention uses the principle of adding vector currents in the current transformers, these vector currents are available for metering of normal operation not heretofore available with fault current detection devices. This control scheme lends itself to ready connection from the terminal block or receptacle of a bank of lights for ungrounded systems, if such ground fault indication is desired.

Ground fault currents are often low amperage arcing currents of too low a magnitude to operate normal circuit protectors such as fuses and circuit breakers. Nevertheless these currents can do considerable damage due to heating and burning, and they can constitute shock hazards. In the present invention, these low magnitude currents are detected and an alarm is actuated. For many low magnitude ground faults, it is not necessary to interrupt the entire main power supply system. It is often sufficient if an audible or visual alarm is actuated to indicate that a fault exists, so that immediate steps can be taken to locate and correct the fault in the local circuit before it does damage, or before it becomes so severe that the entire power supply system is cut off by its circuit breakers or fuses. Obviously, interruptions of the entire power supply system should not occur if the fault can be located and corrected before it becomes too large.

According to the invention, individual current transformers are employed for each of the conductors in a multiple conductor circuit. The currents of the secondaries of these transformers are connected to vectorially add and the vector sum of the currents is constantly monitored by a current sensitive relay which will close its contacts when a preset value of the vector sum is caused by a ground fault. One set of contacts on the relay goes to the terminal block or receptacle to permit the trouble signal to be extended to any desired location. The other set of contacts actuate a signalling relay which closes its own contacts and holds them closed until manually reset or until they open due to power interruption of the circuit being monitored. The closing of the signalling relay contacts sounds a horn and lights a lamp at the location of an enslosure of the control means. These signals continue to operate as mentioned above, until manually reset to assure that proper attention is given to the ground fault when it occurs.

Also according to the invention, the terminal block or receptacle is wired to have voltage terminals and current terminals from the above mentioned current transformers, all of which taken together provide for metering of each conductor separately and or the multiphase circuit as a whole. If the voltage of the circuit being monitored is too high for metering purposes, then potential transformers are used as shown in accompanying FIG. 1. The transformer connection shown are for a 3-stator meter or three single phase meters or any other meter connection desired may be used. A power transformer for the signalling relay, horn and light is shown in FIG. 1. If the circuit being monitored is of such voltage that is is usable directly, this transformer will be omitted. If the application of the control scheme requires extreme meter accuracy, then dual current transformers may be used with the second set of secondaries connected only to the current sensitive relay and the first set connected only to the terminal block or receptacle.

Also according to the invention, the control scheme can be embodied in an enclosure containing the transformers, relays and associated circuitry. The current transformers may be window type where the conductors pass through unbroken. Alarm devices and meters can be monuted on the enclosure or they can be remotely located and connected to the circuitry in the enclosure via a plug and receptacle combination or wired directly to a terminal block. Devices such as switches, relays or circuit breakers which control the circuit being monitored would normally be exterior to this enclosure and can be connected to the circuitry within the enclosure via the plug and receptacle or direct wired to a terminal block. However, the control means could be mounted within a switch enclosure, circuit breaker enclosure or enclosure also housing other electrical equipment of various types.

For further comprehension of the invention, and of the objects and advantages thereof, reference will be had to the following description and accompanying drawings and to the appended claims in which the various novel features of the invention are more particularly set forth.

In the accompanying drawings forming a material part of this disclosure:

FIGS. 1 and 4 are diagrams of two control systems embodying the invention.

FIG. 1A is a perspective view of a plug arranged to mate with the receptacle of FIG. 1, and a meter box, with possible arrangement of metering and extended control devices shown schematically.

Figure 1:
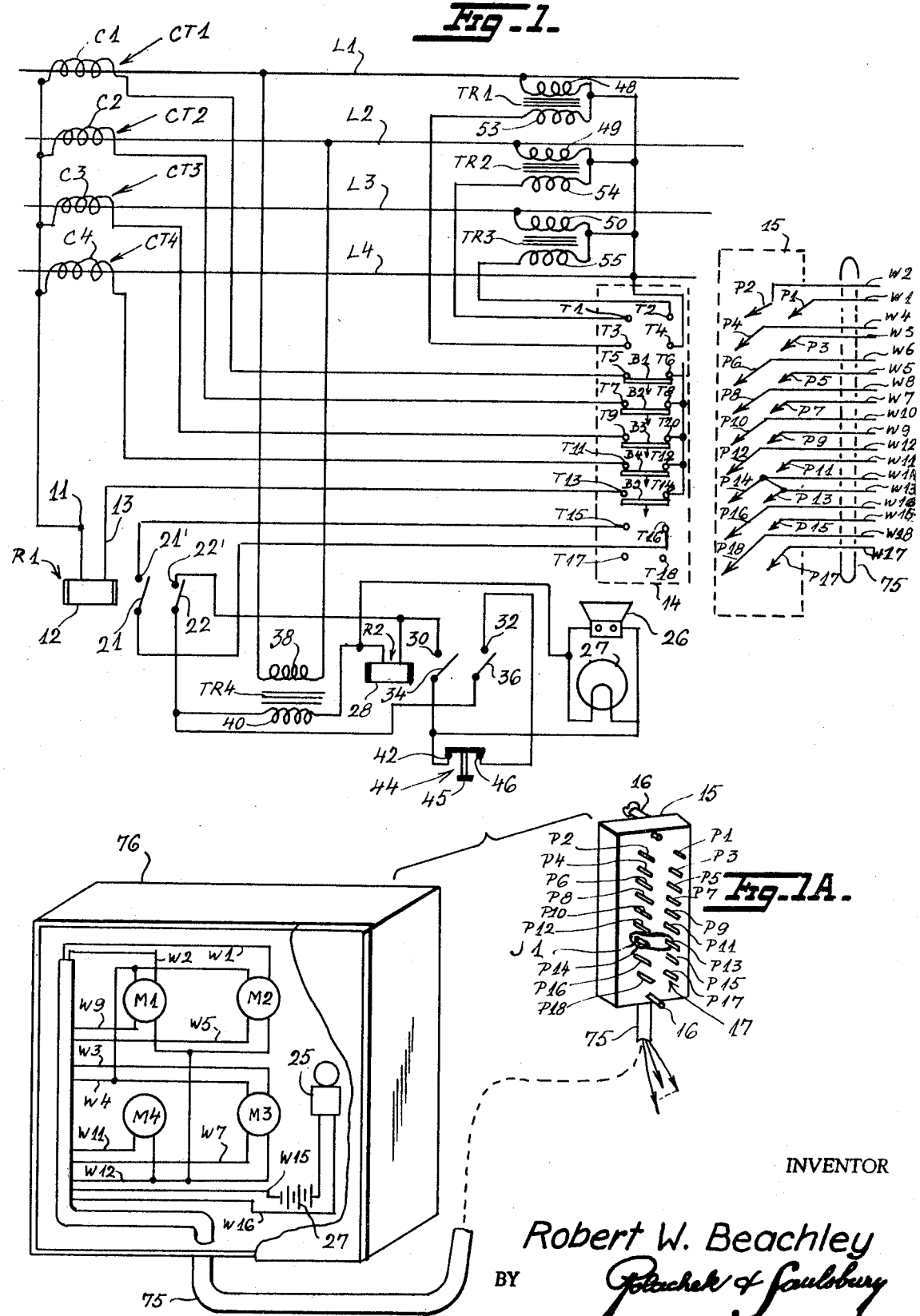

Referring first to FIG. 1, there is shown the circuitry of a system 10. Three conductors L1, L2 and L3 of a four-line three phase power supply system are interposed between a power source and load (not shown.) The conductors conduct alternating current in three different phases. The fourth conductor serves as the neutral conductor. The conductors L1–L4 may be current carrying cables or busbars. Encircling the respective conductors L1–L4 are current transformers CT1–CT–4. These transformers have coils C1, C2, C3 and C4, respectively. One end of each of coils C1, C2, C3 and C4 is connected in common to one terminal 11 of a sensitive relay coil 12. The other end of each coil C1, C2, C3 and C4 is connected to terminals T5, T7, T9 and T11 respectively on a terminal board or receptacle 14.

The control scheme has a terminal board or receptacle 14 provided with terminals, sockets or jacks T1–T18. A plug 15 shown to best advantage in FIG. 1A can, with pins or prongs P1–P18, be plugged into receptacle 14 to connect with the several pins and terminals. The receptacle has spring held shorting bars B1–B5 which when the plug is withdrawn short terminals T5 to T6, T7 to T8, T9 to T10, T11 to T12 and T13 to T14 so that the current transformers do not open circuit if the plug 15 is withdrawn.

Potential transformers TR1, TR2 and TR3 are provided in the control scheme. If the voltage level of the circuit being monitored can be handled directly, the potential transformers may be omitted; in which case terminals T1, T2, T3 and T4 may be directly connected to the circuit wiring. However, where voltage levels are too high for metering purposes, the transformers are connected as shown in FIG. 1. One end of each primary winding 48, 49 and 50 is connected to line L4 and one end of each secondary winding 53, 54 and 55 is connected to line L4 and to terminal T4. The other ends of the primary windings are connected to lines L1, L2 and L3. The other ends of the secondary windings are connected to terminals T1, T2 and T3 respectively.

With the connections to the receptacle so far described, it can be seen that a plug 15 properly wired via wires W1–W17 to desired metering, test or control equipment can do the following:

(a) Read the current in line L1 from pins P5 and P6, in line L2 from pins P7 and P8, in line L3 from pins P9 and P10, and in line L4 from pins P11 and P12. Thus it is possible to read each phase current and the neutral current individually.

(b) Read the vector sum of the circuit currents from pins P13 and P14 and use this indication of the ground fault current in any metering or control device deemed desirable at a remote point.

(c) Read the voltages of the system phase-to-phase from pins P1 and P2, P2 and P3 or P3 and P1, and read the voltages from neutral to each phase from pins P4 to P1, P4 to P2 and P4 to P3.

(d) Combine these currents and voltages in any manner deemed desirable in various possible metering and control arrangements. One such arrangement is shown in FIG. 1A.

Relay R1 of which relay coil 12 is a part has movable contacts 21, 22 normally open with respect to fixed contacts 21', 22' respectively, when the relay is deenergized or when insufficient current flows in coil 12 to operate the relay.

Another relay R2 is provided for actuating alarm devices such as a signal lamp 24 and a horn 26. Relay R2 has a coil 28 and movable contacts 34, 36 normally open with respect to fixed contacts 30, 32 when the relay is deenergized.

A stepdown power transformer TR4 is provided for energizing relay R2 and the alarm devices. If the voltage level of the circuit being monitored is suitable for relay coil 28, light 24 and horn 26, transformer TR4 may be omitted and a direct connection can be made to the main circuit for powering the relay, light and horn. Transformer TR4 has a primary winding 38 which is connected across lines L1, L2. Secondary winding 40 is connected at one end to relay contact 22 and the other end to one end of relay coil 28. The other end of coil 28 is connected to contact 22'. Thus the relay will become energized when contacts 22, 22' close. Relay contact 21 is connected to terminal T16 and relay contact 21' is connected to terminal T15. Thus, when relay R1 closes, contacts 21 and 21' close, and an enternal device such as shown in FIG. 1A connected to plug pins P15 and P16 via wires W15, W16 will detect that the circuit has experienced a ground fault current of sufficient magnitude to operate relay R1. Since contacts 21 and 21', terminals T15 and T16 and plug pins P15 and P16 are not electrically connected to the circuitry of the control system and the contacts are closed only for the duration of the ground fault, pins P15 and P16 may be connected into any external circuit that may be desired to indicate, record or control the ground faulted circuit. Thus provisions are made for visual and/or audible signal of a ground fault at the location of an enclosure embodying the control system and for remote indication and/or control of the ground fault.

Normally closed pushbutton switch 44 is spring held closed and is located locally near alarm devices 24 and 26. One contact 46 of this switch is connected to contact 32 and contact 42 is connected to contact 34 of relay R2. When relay R1 closes it causes relay R2 to also close, as before mentioned. When relay R2 closes, contacts 30 and 34 close to energize the alarm devices 24, 26, and contacts 32 and 36 also close to keep coil 28 energized even after contacts 22 and 22' open should the ground fault be of short duration. Momentarily depressing the button 45 breaks the circuit from contact 42 to 46, which interrupts the circuit of contacts 22 to 36 to 32 to 46 to 42 to 34 to 30 and thus to coil 28. If the contacts 22 to 22' have opened relay R2 will thus be deenergized. Releasing button 45 resets relay R2 for operation at the time of the next ground fault.

The unconnected terminals T17 and T18 of terminal block or receptacle 14 as well as additional terminals which can be provided are reserved for connection of other apparatus to expand the versatility and control of the system. For example, relays and indicators can be provided to indicate reverse phase, dead phase, proper voltage levels and other circuit conditions. As a further example, meters could be included in the enclosure of the control system with contacts that would telemeter circuit conditions (both normal and fault) to a remote location via additional terminals at receptacle 14.

FIG. 1A shows one possible use of the plug 15 with pulling in and jacking screws 16 when inserted into the receptacle 14 and tightened into place insures and maintains firm contact between pins P1–P18 and terminals T1–T18 respectively of the receptacle. Wiring W1–W18 from pins P1–P18 respectively is extended via cable 75 to meter and control signal box 76. Wiring could equally well be extended by wire in conduit, or other means, as well as by cable. The meter box shown has single phase wattmeters M1, M2 and M3, an ammeter M4, a bell 25 and battery 27. Wiring connections W1–W5, W7, W9, W11, W12, W15, W16 are indicated within the meter box 76 showing to which correspondingly numbered pins of plug 15 the various components are connected; see also FIG. 1. As wired, meter M1 will read watts in the phase of line L1, meter M2 will read watts in the phase of line L2, meter M3 will read watts in the phase of line L3, meter M4 will read current in amperes in the neutral conductor L4. The bell 25 will sound when a ground fault current occurs of sufficient magnitude to operate relay R1 shown in FIG. 1 and will stop ringing should the ground fault current stop flowing or reduce in magnitude sufficiently to permit relay R1 to open its contacts. For any given meter or control connection, it is necessary to install shorting jumpers on the pairs of pins P5 to P6, P7 to P8, P9 to P10, P11 to P12 and P13 to P14 when the metering arrangement being used does not require the use of any of the named pins so that insertion of the plug which depresses the shorting bars B1–B5 in the receptacle does not open circuit a current transformer. For example: with the arrangement shown in FIGS. 1 and 1A, a jumper J2' is required from pin P13 to P14 since shorting bar B5 opens when plug 15 is inserted. The arrangement of meters M1–M4 shown in FIG. 2A is only typical of many possible functions the plug and receptacle can perform if properly connected. This arrangement might well be used as a trouble set for an electrical system having many control setups installed throughout the system, and can be carried to a location where a circuit has been showing intermittent ground fault currents that have been hard to locate and correct. By observation of the various meters, it could be determined which conductor is ground faulting since the meter on the faulting conductor would show a sudden increase in power. By changing the connections of meter M4 from pins P11 and P12 (where the reading is amperes in the neutral) to pins P13 and P14 the actual magnitude of the ground fault current could be observed and fluctuations noted which may give a clue to the nature of the ground fault. This typical metering and signal arrangement is only one possible use of the plug and receptacle. More permanently connected meters, relays, signals and the like can be extended from the wiring of the terminals of the receptacle either by use of the plug or directly connected. Thus a complete performance record of the circuit being monitored may be kept by totalizing meters, strip chart meters, or periodic readings of indicating meters. Connections from pins P15 and P16 may be made to control devices which could deenergize the circuit through external switch or breaker, perhaps with time delay if the ground fault persists too long.

Figure 2:
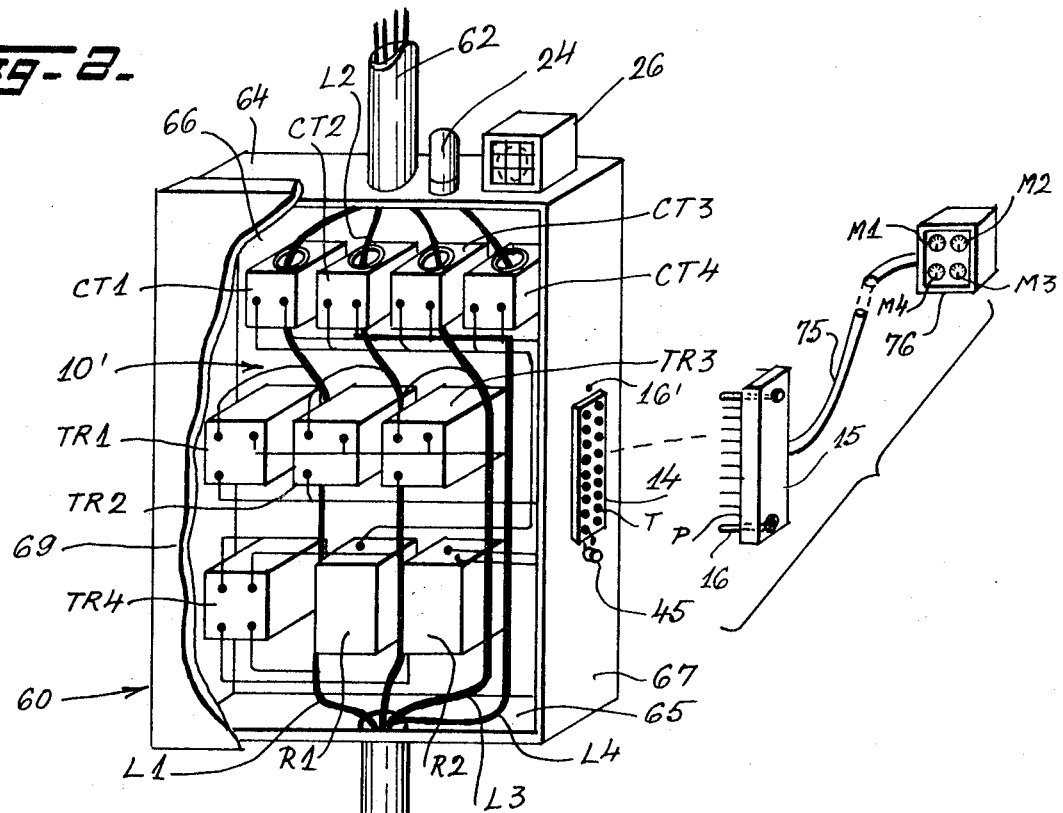
FIG. 2 is a perspective view partially diagrammatic in form of an assembly including an enclosure for parts of current carrying conductors and associated fault detecting circuitry, which assembly constitutes one possible practical embodiment of the invention.

FIG. 2 shows parts of a practical embodiment of the system in which an enclosure such as a box 60 is installed at a convenient location in a power supply line. Conduit shields 62, 63 are connected to and terminate at top and bottom walls 64, 65 of the box. The individual conductors L1–L4 are spliced to the respective insulated lines which carry current between the power supply and loads in the several branch circuits. On back wall 66 of the box are mounted parts of fault detection system 10'. Parts corresponding to those of system 10 in FIG. 1 are identically numbered. Receptacle 14 is mounted at one side wall 67 and jack terminals T are exposed for receiving pins P of plug 15. The plug is connected via a cable 75 to a remotely located meter box 76 where meters M1–M4 are installed. Reset button 45 is on side wall 67. The horn 26 and alarm lamp 24 are mounted on top wall 64. The box is provided with a removable front cover 69, part of which is broken away to show the internal arrangement of the components of the system. The box 60 can be flush mounted in a recess in a supporting wall, ceiling or floor or it can be mounted on a wall to extend therefrom, however is most convenient. If desired, the meters can be wired directly to a terminal board containing terminals T, without using a receptacle and plug. Also, the meters can be mounted on, in or near box 60 instead of remotely therefrom. Plug 15 has pulling in and jacking screws 16 which engage in screwholes 16' at receptacle 14 to insure secure attachment of the plug to wall 67 of box 60 while the plug is in use and to permit easy withdrawal when not in use.

Figure 3:
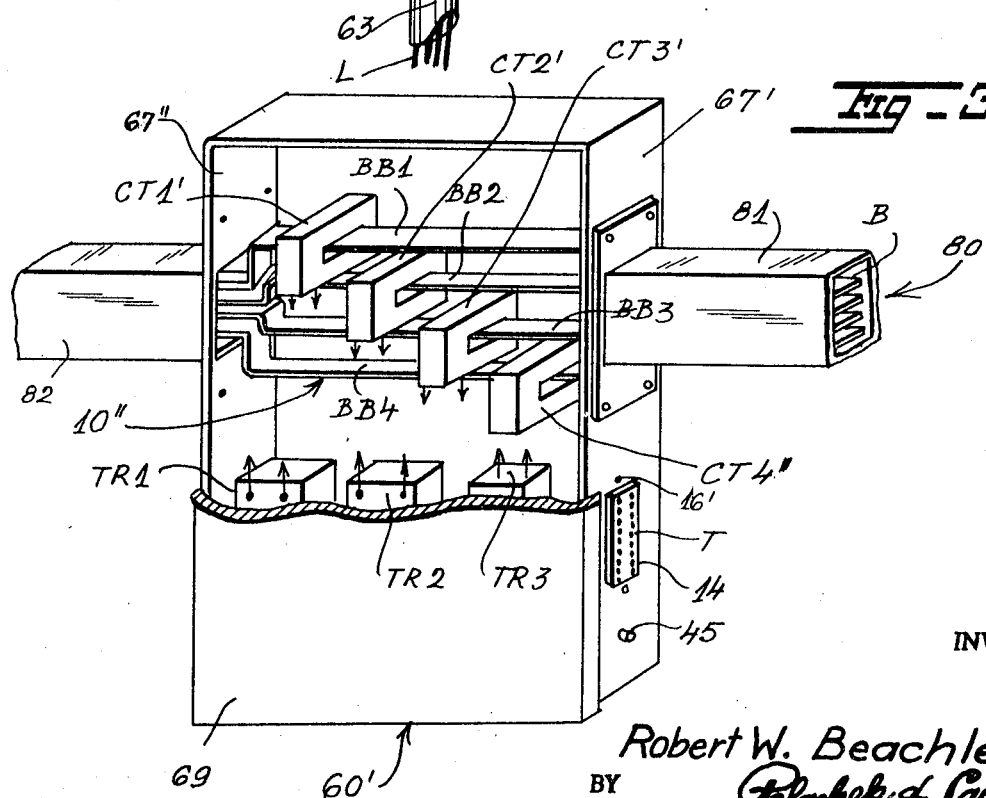
FIG. 3 is a perspective view of another assembly including an enclosure for busbars of a busway and associated fault detecting circuitry, illustrating another practical embodiment of the invention.

FIG. 3 shows fault detection system 10'' adapted for use with a busway 80 having busbars B corresponding electrically to wire conductors L shown in FIG. 2. Conduits 81, 82 of the busway are attached to side walls 67' and 67'' of box 60'. Inside box 60' are busbars BB1–BB4 corresponding electrically to conductors L1–L4 of system 10 and connected at opposite ends to busbars B. Current transformers CT1'–CT4' are rectangular and surround busbars B1–B4 to perform functions in the system 10'' similar to those described for current transformers CT1–CT4, of system 10. Components such as transformers TR1–TR3 and other components of the system 10'' not shown in FIG. 3, correspond to those of FIGS. 1 and 2.

In FIG. 4 is shown another control system 10A which is generally similar to system 10 of FIG. 1 and corresponding parts are identically numbered. This system is adapted for providing greater accuracy in metering the lines which are monitored for detection of ground faults. In system 10A the current transformers CT''–CT'' which encircle respective conductors L1–L4 have dual coils C1'–C1'', C2'–C2'', C3'–C3'' and C4'–C4'' respectively. One set of coils C1''–C4'' operates relay R1 while the other set of coils C1'–C4' are connected to terminals T'5–T'8 and T'15, T'16 at terminal board or receptacle 14' for metering and control purposes. Coils 53, 54 and 55 of transformers TR1–TR3 are connected to terminals T'1–T'8 respectively of receptacle 14'. If the connections are to be permanent then shorting bars such as bars B1–B5 employed in receptacle 14 of FIG. 1 can be omitted. Otherwise these shorting bars must be supplied to close the circuits of coils C1'–C4' when the plus is out of the receptacle.

Pins P1'–P8' are connected to meters M1', M2' and

M3'. Pin P9' is connected to battery 27 which energizes the remotely located alarm bell 25 connected in turn to pins P10' and P13'. By arrangement shown, it will be apparent that meters M1', M2' and M3' will exhibit readings of power in watts of the individual branch circuits of conductors L1, L2 and L3 respectively and the bell will ring when relay R1 is closed. Another meter M4' is connected via pins P15' and P16' and terminals T'15, T'16, to coil C4' to measure current in line L4. Terminals T'13, T'14 are connected via pins P13', P13' to a remotely located load device 29. This can be a circuit breaker or other load. If it is a circuit breaker it could open the circuit of some instrument (not shown) which might be damaged if a ground fault existed. Alternatively the load device could be a timer or recording device for indicating the length of time a ground fault continues. Other uses can readily be devised for the load device connected to the system and operated upon occurrence of a ground fault detected by system 10A.

Pin P12' is connected to contact 33 of a remotely located normally closed pushbutton switch 31. The other contact 37 of the switch is connected to pin P11'. Associated terminal T'11 is connected to relay contact 32. Relay contact 36 is connected to transformer winding 40. By the arrangement shown and described, the relay coil 28 will become energized when contacts 22, 22' close. At the same time a holding circuit for the relay R2 is completed via closed contacts 30, 34, switch 44, switch 31, and contacts 32, 36. The horn and lamp will become energized via relay contacts 30, 34 and relay contacts 22, 22'. A parallel energizing circuit for the horn and lamp will be closed through switches 44 and 31 and relay contacts 32, 36. Thus the horn and lamp will become energized along with relay R2 when relay contacts 22, 22' close. Thereafter if relay contacts 22, 22' open, the relay R2 and the alarm devices will still remain energized through the holding circuit described. To reset the relay R2 and turn off the alarm devices, either switch 31 or switch 44 can be manually operated. Momentary pressure on switch button 39 or 45 will serve to reset the relay R2 by opening the holding circuit so that the relay and the alarm devices become deenergized.

The remotely located alarm device 25 will become energized when contacts 21, 21' close and will stay energized as long as the detected ground fault exists.

When a ground fault occurs, the net or totalized current sensed by transformers CT1"–CT4" changes from a vector sum of zero to some magnitude sufficient to energize the relay 12. Contacts 21 and 22 close with contacts 21' and 22' to actuate relay R2 and to set off the alarm devices and operate load device 29. The meters M1'–M3' indicate by a change in reading which of the individual branch circuits served by lines L1–L3 is affected by the ground fault and the relative magnitude of the fault. The neutral line L4 is monitored by a meter M4 which can be connected to pins P15', P16'. If desired the meters M1'–M4' can be located locally at the site of transformers CT1"–CT4" and TR1–TR4 or they can be remotely located for telemetering purposes.

The unconnected terminals T'17, T'18 and pins P17', P18' are reserved for connection of other apparatus to expand the versatility and control of the system. For example relays and indicators can be provided to indicate reverse phase, dead phase, proper voltage levels and other circuit conditions. If desired the meters M1'–M4' can be provided with contacts which close when currents in the meters reach predetermined magnitudes. The contacts can be connected in circuit with load devices such as circuit breakers, alarm devices, or control devices of various types to perform any desired function when the meter contacts close. As further alternatives, the meters can form part of or can be replaced by graphic recording devices to provide permanent records of any ground fault currents detected by the system.

While I have illustrated and described the preferred embodiments of my invention, it is to be understood that I do not limit myself to the precise constructions herein disclosed and that various changes and modifications may be made within the scope of the invention and defined in the appended claims.

What is claimed is:

1. A system for ground fault detection in a plurality of branch conductors carrying alternating currents in a multibranch electrical power supply circuit, comprising: monitor means for deriving inductively from the conductors derivative currents corresponding in magnitude and phase to the currents flowing through the respective conductors; circuit means connected to the monitor means for adding the derivative currents vectorially, said circuit means being responsive to the vector sum of the derivative currents if the sum exceed a predetermined magnitude; and indicating means operative by said circuit means to indicate that a ground fault current is flowing from any one of the conductors; said circuit means comprising first relay means responsive to current flow of at least said predetermined magnitude; said indicating means comprising at least one alarm device connected in circuit with said relay means and actuated thereby to indicate the occurrence of the ground fault current; said monitor means comprising current transformers surrounding the respective conductors individually; means connecting tne transformers in circuit with the relay means; a plurality of circuit terminals; a plurality of ammeters; an electrical connector connecting certain ones of said circuit terminals in circuit with said ammeters and said transformers so that the ammeters provide current readings corresponding to the currents flowing in the several conductors; second relay means connected in circuit with said first relay means and said alarm device and arranged to continue operation of the alarm device in the event the first relay means become deenergized by termination of the detected ground fault; means connecting each of said first and second relay means to others of said circuit terminals; an enclosure, said transformers being located in said enclosure, said conductors passing through said enclosure, said alarm device being mounted on said enclosure; and a multiple contact receptacle mounted on said enclosure and exposed externally of the enclosure for receiving and engaging a multiple contact plug, said circuit terminals all forming parts of said receptacle, whereby external metering means and external circuit control means can be connected to the conductors, transformers and first and second relay means via said plug when engaged with said receptacle to enable external metering of the ground fault current and external control of the system by the external control devices.

2. A system as defined by claim 1, further comprising potential transformers located in said enclosure and connected to the several conductors for obtaining derivative potentials proportional in magnitude to potentials between the several conductors, means connecting said potential transformers to still others of said circuit terminals; and watt-meters connected to said multiple contact plug and connected electrically in circuit with some of said circuit terminals when the plug is engaged with said receptacle to provide readings of electric power corresponding to power flowing in the several conductors.

3. A system as defined by claim 2, further comprising still other relay means connected in circuit with said conductors and selected ones of said circuit terminals, to provide voltages thereat indicative of reverse phase, dead phase, and proper voltage levels when appropriate other meters are connected to the last named selected terminals via certain contacts of said electrical connector when engaged with said receptacle.

4. A system as defined by claim 1 wherein for the purposes of greater metering accuracy, the said current transformers have dual secondaries and the ground fault current detection circuit and the metering circuit are electrically insulated one from the other.

References Cited

UNITED STATES PATENTS

| | | | |
|---|---|---|---|
| 1,578,571 | 3/1926 | Angus | 324—107 |
| 2,154,270 | 4/1939 | Harder | 324—107 |
| 2,565,824 | 8/1951 | Petzinger | 324—107 |
| 3,253,215 | 5/1966 | Moakler et al. | 324—51 |
| 3,308,345 | 3/1967 | Van Cortlandt Warrington | 317—18 |
| 3,356,939 | 12/1967 | Stevenson | 324—51 |
| 3,418,569 | 12/1968 | Paddison | 324—52 |

FOREIGN PATENTS

| | | |
|---|---|---|
| 515,366 | 1/1931 | Germany. |
| 313,689 | 6/1929 | Great Britain. |

OTHER REFERENCES

Stubbings, G. W.: Automatic Protection of A.C. Circuits, 4th ed., 1954, Chapman & Hall Ltd., London, pp. 195–200.

GERARD R. STRECKER, Primary Examiner

U.S. Cl. X.R.

317—18; 324—107